Oct. 4, 1938.    M. T. MALLARD    2,132,268
PROCESS OF SURFACE FINISHING RUBBER GOODS
Filed Jan. 30, 1937
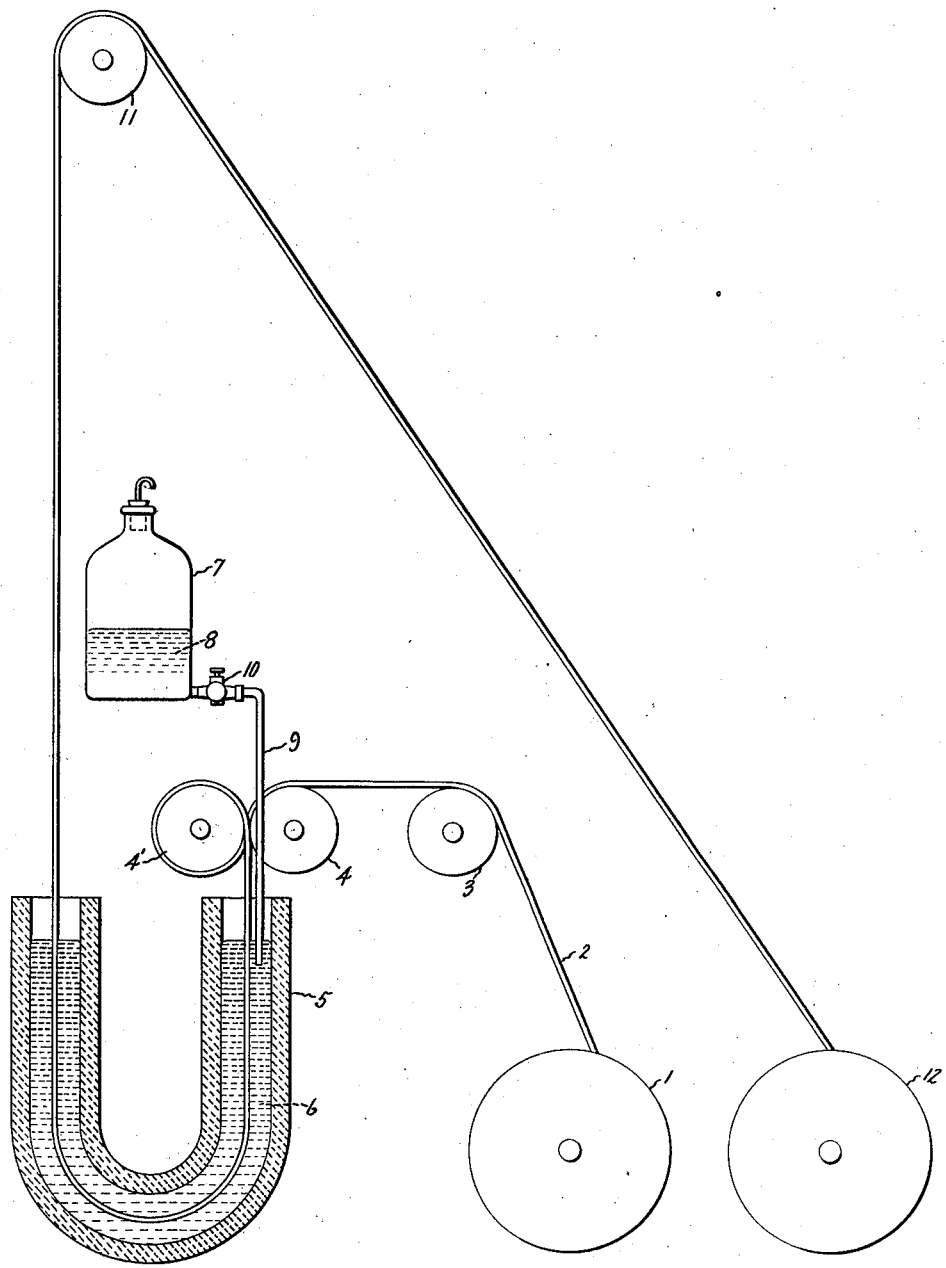
Inventor:
Manley T. Mallard,
by Harry E. Dunham
His Attorney.

Patented Oct. 4, 1938

2,132,268

UNITED STATES PATENT OFFICE 2,132,268

PROCESS OF SURFACE FINISHING RUBBER GOODS

Manley T. Mallard, Fairfield, Conn., assignor to General Electric Company, a corporation of New York Application January 30, 1937, Serial No. 123,215

7 Claims. (Cl. 91—68)

This invention relates broadly to a process of surface finishing rubber goods. The invention is especially concerned with various improvements and modifications in a continuous process for imparting a surface finish to continuous length articles composed of, or having an exterior surface of rubber or of rubber compound, by contact with a solution containing active halogen ingredient. An example of such a solution is one containing free halogen such as bromine, chlorine or iodine, or containing halogen compound such as sulphur halide, for instance sulphur chloride or bromide. The article to be surface finished may be in the form of a continuous sheet, tape, thread, cord, or the like. A specific example of an article that advantageously may be treated in accordance with this invention is a flexible, rubber-covered electrical conductor or cable of the kind used with certain domestic household appliances such as vacuum cleaners and commonly referred to as a "rubber cord".

It has been known that the surface of a rubber article may be improved by treatment with halogen-containing solutions of the kind mentioned. Coating the rubber surface with compositions comprising shellac, casein and the like prior to the halogenating treatment also has been proposed. However, such treating methods heretofore have not gone into general use, for one reason because of difficulty in so controlling and regulating the treatment as to obtain uniform results. Further, retreatment often was necessary in order to provide a surface having a finish of the desired quality or comparable with the finish previously established as standard. Hence finishes for rubber articles commonly have been lacquers, varnishes, waxes and powdered materials, such as talc, starch, mica, and the like, despite their known disadvantages.

An object of my invention is to provide a consistently uniform and permanent surface finish on continuous length articles composed of, or having an exterior surface of rubber or of rubber composition, hereinafter for brevity collectively designated as rubber, which finish is integral with the rubber, is hard, smooth, dust-and abrasion-resistant, and will not crack or peel off.

A further object of the invention is to provide a rapid and comparatively inexpensive continuous method or process of producing, with minimum attention from an operator, a consistently uniform surface finish of the kind described in the preceding paragraph.

In accordance with the present invention the rubber article, for instance an insulated wire having an exterior surface of rubber, advantageously is first vulcanized in the usual manner. It is then passed continuously through a treating solution consisting of a very dilute, non-aqueous solution of an active halogen substance contained in a suitable receptacle, for example, a container of U-shape. During the passage of the article through the described solution, there is continuously added thereto a substantially more concentrated solution of the same active halogen substance in the same solvent. Such solution is added at such rate of flow as to maintain a practically constant volume of treating solution. In this manner the concentration of the treating solution is also maintained practically constant, a condition that I have found to be essential in obtaining a consistently uniform surface finish. After passing through the halogen solution the rubber-covered wire is continuously dried and wound on a take-up reel. The treated rubber has consistently uniform surface characteristics. It has a smooth, dull, satiny appearance and a permanent, hardened surface finish which has a "non-draggy" feeling to the touch and which does not pick up dust or lint readily. The rubber surface is not easily marked or marred, and any surface abrasions that do occur are inconspicuous.

The novel features which are characteristic of my invention are set forth in the appended claims. The invention itself, however, will best be understood from reference to the following more detailed description when considered in connection with the accompanying drawing in which the single figure is a diagrammatic view of apparatus used in carrying the invention into effect and illustrative thereof.

In the drawing 1 is a pay-off reel from which a rubber-surfaced cord 2, for example, a rubber-covered conductor, is passed over pulley 3 and capstans 4, 4', which may be power-driven, through a U-shaped vessel 5 of ceramic or other suitable corrosion-resistant material and containing a liquid reagent or treating solution 6, which is a non-aqueous solution of an active halogen substance of low concentration, such as a carbon tetrachloride solution of bromine or sulphur monochloride. Receptacle 7 contains liquid 8 which is a substantially more concentrated solution of the same active halogen substance in the same solvent as comprises treating solution 6. The receptacle 7 advantageously may be made of glass and conveniently may be a glass bottle, so that the amount of liquid therein readily may be observed. This receptacle preferably is situated at a level above U-shaped vessel 5 so as to provide gravity flow of liquid 8 to vessel 5 through outlet line or tube 9, which may be made of glass or other suitable material. Valve 10 in line 9 provides means for controlling the rate of flow of liquid 8 to vessel 5. From U-shaped vessel 5 cord 2 passes upward and over pulley 11 and is wound on take-up reel 12, the length of travel of the cord being such as to expose it to the atmosphere for a period of time sufficient to dry it, that is, to free it of solvent.

The following description is illustrative of how the invention may be carried into effect:

U-shaped vessel 5 is filled with a solution of an active halogen substance. A non-aqueous solution of bromine or sulphur monochloride is preferred. The solvent employed should be one which is inert, or substantially so, to the halogen substance. It should have such boiling point or boiling range that it will evaporate from the rubber surface fairly rapidly at temperatures non-harmful to rubber. The solvent should not have any deleterious effect on the rubber. Carbon tetrachloride is the preferred solvent because of its comparatively low cost, non-inflammability, inertness to halogen, non-harmful effect on rubber, and advantageous boiling point (76° C.). The use of other solvents, however, is not precluded, and such solvents as methylene chloride, chloroform, ethylene chloride, carbon disulphide, and the like, may be used if desired. When the active halogen substance is bromine a treating solution containing, for example, from about 0.2 to 0.6 per cent by weight of bromine may be employed to advantage. The halogen concentration of the treating solution may be varied somewhat, depending upon the composition of the particular rubber article and the time of contact between the article and the halogen solution. A preferred solution is a carbon tetrachloride solution of bromine containing about 0.4 per cent by weight of bromine. Liquid 8 in receptacle 7, in such case, is a solution containing, for example about 1 to 2½ per cent by weight of bromine in like non-aqueous solvent. For example, in the treatment of a single, vulcanized rubber-covered conductor in continuous length and of about 0.3 inch overall diameter, a carbon tetrachloride solution of bromine containing about 1¼ per cent by weight of bromine has proved suitable for use as a compensating solution.

Having passed cord 2 through U-shaped vessel 5 and connected it over pulley 11 with take-up reel 12, capstans 4, 4' are put into steady operation and the cord is moved continuously through treating solution 6. Capstans 4, 4' feed cord 2 into vessel 5 in such a manner that there is always sufficient slack in the cord, as it passes through the vessel, to prevent the cord either from lifting from the vessel or from breaking due to pull-out tension. With a non-aqueous solution containing a predetermined concentration of bromine within the range of about 0.2 to 0.6 per cent by weight of bromine, the cord is passed therethrough at such rate as to maintain the cord in contact with the treating solution for about 10 to 20 seconds. In the use of the carbon tetrachloride solution of bromine of the preferred concentration, viz., about 0.4 per cent by weight, the cord advantageously is passed through the solution at such rate as to maintain the cord in contact therewith for about 15 seconds.

In passing through treating solution 6, the rubber of rubber-surfaced cord 2 reacts with the bromine present in the solution to such an extent, I have found, as to cause a depletion of the bromine content. As would be expected, the solution also loses some carbon tetrachloride and bromine by evaporation. I also have found that variations in the surface finishes heretofore obtained in treating continuous length rubber-surfaced articles with non-aqueous solvent solutions of active halogen substances have been due to variations in the halogen content of the treating solution during the process of treatment. To maintain the treating solution at practically constant, that is, essentially at its initial concentration and volume, I have further found that it is necessary to add make-up or compensating solution which is substantially more concentrated than the main body of treating solution. Accordingly, while the cord 2 is passing through the solution 6 there is continuously added thereto, from receptacle 7, solution 8 containing about 1 to 2½ per cent bromine, for example, about 1¼ per cent, dissolved in the same non-aqueous solvent employed in solution 6. This solution flows by gravity to vessel 5. Its rate of flow is controlled by properly regulating valve 10. This valve is adjusted and set so as to provide a rate of flow of solution 8 to solution 6 sufficient to maintain the volume of the latter practically constant.

After the continuous length rubber-surfaced cord 2 leaves the U-shaped receptacle 5 it is dried, for instance by passage through air at room temperature, and then is wound on a take-up reel 12. If it is desired to hasten the drying operation, the surface-treated article may be passed through a closed, heated gaseous atmosphere maintained at a temperature non-harmful to rubber but sufficiently high to evaporate the solvent readily. Upon leaving receptacle 5 excess liquid on the rubber surface may be removed, if desired, by wiping the article with a material such as felt or rubber, or by means of an air blast.

It has been my observation that free halogens, such as bromine, in solution or other form react with rubber with extreme rapidity. The extent of the reaction is dependent mainly upon the concentration of the bromine and upon the time and temperature of contact. These influencing factors are very critical in the production of a hard, smooth rubber surface free from cracking and other undesirable tendencies or characteristics. They are particularly critical in producing consistently uniform surface finishes on rubber. Temperature is a factor of lesser importance than the other two. In practicing this invention satisfactory results may be obtained with bromine concentrations and periods of contact of the order described at treating solution temperatures ranging between about 40° and 140° F. The described method for finishing a rubber surface conveniently and effectively may be conducted at room temperature. The temperature may vary between about 50° and 100° F.

With increase in bromine concentration the permissible time of immersion of the rubber article becomes less and less. This is because hardening a rubber surface by reaction with bromine renders the rubber article less flexible, less resistant to aging and more likely to form surface cracks. Another factor of great importance in brominating a rubber surface with a solution of bromine is the amount of treating solution carried on the rubber as it leaves the treating bath. Such adhering solution results in a continued bromination of the rubber as the wet surface dries.

This effect is additive to the surface changes produced by immersion in the liquid-treating solution, and is more pronounced and more difficult to control the more concentrated the bromine solution. I have found that most satisfactory and uniform results are obtained when the bromine solution is maintained at a practically constant volume and essentially at its initial concentration as hereinbefore set forth, and when the period of contact of the rubber article therewith is of the order of 10 to 20 seconds. Bromine solutions of the low concentrations described obviate the necessity for stopping the reaction of the bromine with the rubber after the article leaves the treating bath by contact with liquid or gaseous ammonia or other neutralizing agent.

In using sulphur chloride the procedure is essentially the same as hereinbefore described with the exception that somewhat more concentrated solutions are employed, due to the fact that sulphur chloride does not react quite so rapidly with rubber as does bromine. Consequently, the preferred sulphur chloride treating solution is one containing a predetermined concentration of sulphur chloride in non-aqueous solvent within the range of about 0.3 to 0.8 per cent by weight of sulphur chloride, and advantageously is a carbon tetrachloride solution of sulphur monochloride containing about 0.5 per cent by weight of sulphur monochloride. The preferred make-up or compensating solution contains about 1½ to 3½ per cent of sulphur chloride in the same non-aqueous solvent as the main body of treating solution. Advantageously this make-up solution is a carbon tetrachloride solution of sulphur monochloride containing about 2 per cent by weight of sulphur monochloride when surface treating a single vulcanized rubber-covered conductor in continuous length and of about 0.3 inch overall diameter. The time and temperature of contact are essentially the same as hereinbefore described with reference to the use of a bromine treating solution.

Because bromine discolors light-colored rubber goods, I prefer to use a sulphur monochloride solution on such articles. The bromine solution preferably is employed only in surface finishing black, dark brown, and other dark-surfaced rubber articles.

Although the movement of the article through the treating solution ordinarily causes sufficient agitation of the bath to insure its uniformity, in certain cases it may be desirable to provide means for mildly agitating solution 6 as a more definite assurance of uniformity in its composition. Such agitation may be effected most conveniently and advantageously by using a circulating pump and lines (not shown in the drawing) to withdraw liquid from one point in receptacle 5 and to introduce the withdrawn liquid at another point. Thus, treating solution may be withdrawn from that side of receptacle 5 to which liquid 3 is added and be pumped to the opposite side.

In practicing this invention it is desirable that the rubber article be practically free of surface moisture. For satisfactory results this is particularly true in the use of a sulphur monochloride treating solution since water causes sulphur monochloride to decompose.

The surface-finishing process hereinbefore described is not limited to the treatment of a single rubber article in continuous length in a single treating bath. For example, I may pass simultaneously two or more such rubber articles, for example, two or more rubber-covered conductors, through a single treating bath of the kind and concentration hereinbefore described. In such case, the make-up or compensating solution contains a somewhat more concentrated solution of halogen substance than when passing a single article through the bath, and approaches the higher halogen concentrations herein mentioned, or somewhat in excess thereof. When operating in this manner, more highly concentrated make-up solution is necessary so as to maintain practically constant the concentration of the treating solution, since for a given volume of treating solution and the same time of contact depreciation of halogen content increases with an increase in the surface area of the rubber article or articles passed therethrough.

The process herein set forth is applicable to the surface finishing of unvulcanized or vulcanized articles composed of, or having a surface of natural or synthetic rubber or of natural or synthetic rubber compound. In the preferred embodiment of the invention the described treatment is applied to rubber in the vulcanized state.

By the term "active halogen substance" as used herein I mean a substance comprising halogen in such form as to be capable of reacting with rubber to form a surface finish of the herein-described characteristics.

What I claim as new and desire to secure by Letters Patent of the United States is:

1. A method of producing a hard, smooth finish on a rubber surfaced article which comprises treating said article with a non-aqueous solution containing a concentration of active halogen substance selected from the class consisting of sulphur chloride and bromine within the range of 0.2 to 0.8 per cent by weight of said substance while maintaining the treating solution at a predetermined practically constant volume and concentration.

2. A method of forming a hard, smooth finish on a rubber-surfaced article which comprises treating said article with a non-aqueous solution containing a concentration of bromine within the range of about 0.2 to 0.6 per cent by weight of bromine while maintaining the treating solution at a predetermined practically constant volume and concentration.

3. A method of forming a hard, smooth finish on a rubber-surfaced article which comprises treating said article with a non-aqueous solution containing a concentration of sulphur chloride within the range of about 0.3 to about 0.8 per cent by weight of sulphur chloride while maintaining the treating solution at a predetermined practically constant volume and concentration.

4. In the manufacture of a rubber-surfaced article having a hard, smooth surface finish produced by immersing such article in a treating solution consisting of a non-aqueous solution of active halogen substance selected from the class consisting of sulphur chloride and bromine in a concentration of from 0.2 to 0.8 per cent by weight, the step of maintaining said treating solution at a predetermined practically constant volume and at its initial concentration during the whole treating process.

5. A method of providing a rubber-surfaced article with a smooth, abrasion-resistant finish which comprises contacting such article with a non-aqueous treating solution containing a concentration of bromine within the range of 0.2 to 0.6 per cent by weight of bromine and maintained at its initial volume and concentration during the whole treating process, said article being in contact with said solution for a period of from 10 to 20 seconds.

6. A method of providing a rubber-surfaced article of light color with a smooth, abrasion-resistant finish which comprises contacting such article with a non-aqueous treating solution containing a concentration of sulphur chloride within the range of 0.3 to 0.8 per cent by weight of sulphur chloride, said solution being maintained at its initial volume and concentration during the whole treating process, and said article being in contact with said solution for from 10 to 20 seconds.

7. A method of providing a rubber-surfaced article, with a hard, smooth finish, which comprises treating said article with a liquid consisting of a non-aqueous solution of active halogen substance selected from the class consisting of sulphur chloride and bromine in a concentration within the range 0.2 to 0.8 per cent by weight while simultaneously adding to said liquid a substantially more concentrated solution of the same active halogen substance in the same solvent, at a rate such as to maintain the treating solution at a practically constant volume and at its initial concentration.

MANLEY T. MALLARD.